United States Patent [19]
Rasi
[11] 3,955,172
[45] May 4, 1976

[54] REMOTE CONTROL SONAR BEAM STEERER

[75] Inventor: Ronald T. Rasi, Quaker Hill, Conn.
[73] Assignee: The United States of America as represented by the Secretary of the Navy, Washington, D.C.

[22] Filed: Mar. 5, 1975
[21] Appl. No.: 555,490
[52] U.S. Cl. .......... 340/6 R; 343/100 SA
[51] Int. Cl.$^2$ .......... G01S 3/80
[58] Field of Search .......... 340/6 R; 343/100 SA

[56] References Cited

UNITED STATES PATENTS

| | | | |
|---|---|---|---|
| 3,676,839 | 7/1972 | Wohl et al. | 340/6 R |
| 3,846,745 | 11/1974 | Hill et al. | 340/6 R |

*Primary Examiner*—Richard A. Farley
*Attorney, Agent, or Firm*—Richard S. Sciascia; Arthur A. McGill; Prithvi C. Lall

[57] ABSTRACT

A beam steerer for remote positioning of the listening beams of a sonar array which includes a beam selector switch, a steering control director, an analog switch network, and a delay line. The beam selector switch provides a remote capability of steering the hydrophone array by permitting the selection of any one of a number of listening beam pairs of the array and provides an enable signal to one of the five series-parallel combinations of voltage difference operational amplifiers, steering diodes, and voltage rectifiers of the steering control director. An enable signal from the steering control director provides a low impedance path for the signal from each of the hydrophone elements of the array through one of the analog switches for each hydrophone element and high impedance path for the remaining switches of each of the switch banks of the analog switch network. The output of each of the elements is then properly delayed before the beam is formed by summing the delayed outputs. The beam steerer accomplishes the beam steering processing in the array itself and reduces the array conductor requirements.

4 Claims, 2 Drawing Figures

REMOTE CONTROL SONAR BEAM STEERER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a passive sonar system which is designed for the detection and classification of surface targets and more particularly to a remote control beam steerer for steering the listening beam in order to determine target bearing.

Prior art methods of beam steering towed array require returning hydrophone lead pairs through the tow cable to the towing platform for processing. This results in a large cable diameter, weight and expense to accomodate the multiple conductors. Furthermore, multiplexing techniques are currently employed in beam steering most towed array systems, which require costly specialized cable and complex circuitry in addition to increased power supply demands. Consequently, it is desirable to have a remote control beam steering system wherein beam steering processing is accomplished in the array itself and thus reducing the array conductor and power requirements.

SUMMARY OF THE INVENTION

The objects and advantages of the present invention are accomplished by utilizing a remote control beam steerer for positioning of the listening beams of the sonar array. The beam steerer includes a beam selector switch, a steering control director, an analog switch network, and a delay line. The beam selector switch provides a remote control capability of steering the hydrophone array by permitting the selection of any one of a number of listening beam pairs of the array and provides an enable signal to one of the five series-parallel combinations of voltage difference operational amplifiers, steering diodes, and voltage rectifiers of the steering control director. The enable signal from the steering control director provides a low impedance path for the signal from each of the hydrophone elements of the array through one of the analog switches for every hydrophone element and high impedance paths for the remaining switches of each of the switch banks of the analog switch network. The output of each of the array elements is then properly delayed before the beam is formed by summing the delayed outputs. The remote control beam steerer is housed in a water tight cylinder which is attached to the hydrophone section of the array. Target bearing is determined by electronically steering the listening beam. At low speeds the array is stabilized by a slightly buoyed drogue.

An object of this invention is to have a remote control beam steerer wherein processing is accomplished in the array itself.

Another object of this invention is to have a remote control beam steerer wherein the size and quantity of the cable conductor is minimized.

Still another object of this invention is to obtain an accurate steering control voltage by virtue of very low current demands of the input circuitry of the remote control beam steerer.

Still another object of this invention is to have a remote control beam steerer wherein accurate steering control can be maintained over long lengths of the tow cable.

Still another object of this invention is to have a remote control beam steerer wherein the circuitry used is relatively simple and inexpensive as compared to the complicated multiplexing techniques used so far.

Other objects, advantages and novel features of the invention will become apparent from the following detailed description of the invention when considered in conjunction with the accompanying drawings wherein:

DESCRIPTION OF A PREFERRED EMBODIMENT

Figures 1, 2:
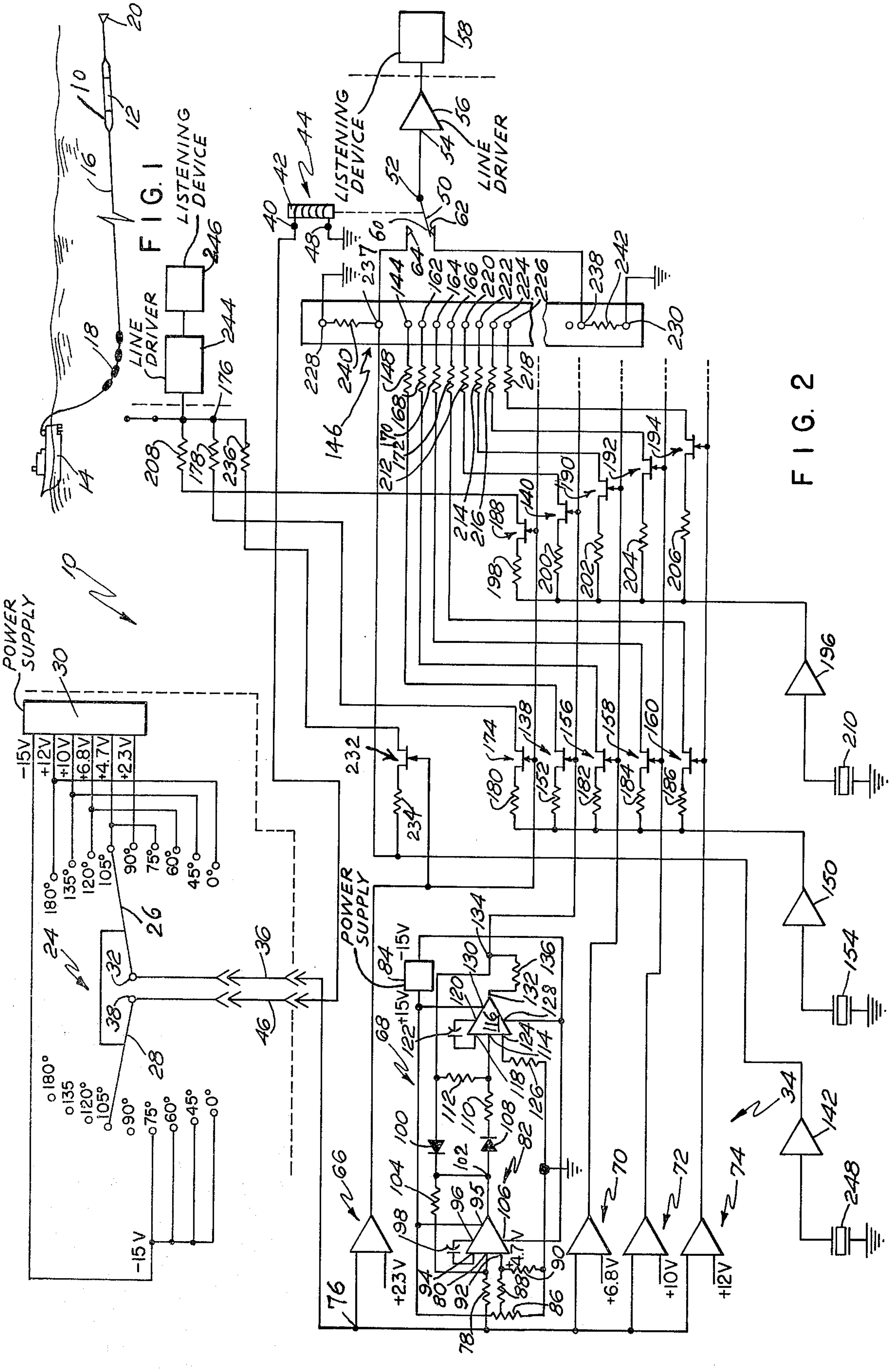
FIG. 1 is a schematic representation of a surface ship towing a sonar array together with the remote control beam steerer.
FIG. 2 is a schematic representation of the electronic circuitry used in the remote control beam steerer.

Referring to the drawings wherein like reference characters designate identical or corresponding parts throughout the various figures, and more particularly to FIG. 1 thereof, a schematic representation of a remote control beam steerer is shown. A beam steerer 10 in conjunction with the sonar array 12 is attached to a surface ship 14 used for towing purposes by means of tow cable 16. Weights 18 are used with the towing cable to keep the sonar array 12 and the remote control beam steerer 10 at a desired position during towing in water. The motion of the sonar array is stabilized by a drogue 20 which is attached to tail end of array. FIG. 2 represents diagrametically the electronic circuitry used in a preferred embodiment of the beam steerer built according to the teachings of this invention. A linear array comprising twenty hydrophones is shown to be steerable at nine different angular positions, i.e., 0°, 45°, 60°, 75°, and 90° in the Fore direction; 105°, 120°, 135°, and 180° in the Aft direction and nine corresponding conjugate positions, i.e., 360°, 315°, 300° , 285°, 270°, 255°, 240°, 225°, and 180°.

A two pole, nine-position switch 24 aboard ship 14 and having wiper arms 26 and 28 is connected to beam steerer 10 by means of tow cable 16. A power supply 30 aboard ship 14 provides various voltages, i.e., −15 volts, +12 volts, +10 volts, +6.8 volts, +4.7 volts, and +2.3 volts to the various terminals of switch 24 as shown in FIG. 2. Fixed terminal 32 of wiper arm 26 is connected to control director 34 by line 36 of tow cable 16. The movable arm of wiper arm 26 can be connected to any one of the nine positions on one of the two desks of switch 24. Fixed terminal 38 of wiper arm 28 is connected to terminal 40 of the coil 42 of an Aft-Fore relay 44 via line 46 of tow cable 16. Terminal 48 of coil 42 is connected to ground. Wiper arm 50 of relay 44 has its fixed terminal 52 connected to the input terminal 54 of line driver 56 which has its output terminal connected to a listening device or headphone 58 aboard surface ship 14. Movable terminal 60 of wiper arm 50 is connected with either contact point 62 or contact point 64 of relay 44 depending upon whether the relay 44 is energized or deenergized. The moveable terminal of wiper arm 28 can be connected to any one of the nine position terminals, four of which are provided with a voltage of −15 volts from power supply 30 located aboard surface ship 14. Steering control director 34 comprises five series-parallel combinations, i.e., 66, 68, 70, 72 and 74, of voltage difference operational amplifiers, steering diodes, and voltage rectifiers. As an example, a complete circuit diagram of one of the series-parallel combinations such as 68 is shown in FIG. 2 wherein fixed terminal 32 of wiper arm 26 of the double pole or deck, nine-position switch 24 is connected via line 36 of tow cable 16 to terminal 76 which in turn is connected to every member of the five series-parallel combination of voltage difference operational amplifiers. Terminal 76 is connected through a resistor 78 to inverting input terminal 80 of a difference amplifier 82. Voltage of +15 volts from power source 84 is applied to a voltage divider comprising a variable resistor 86, resistor 88, and resistor 90. The junction point of resistors 88 and 90 is connected to the non-inverting input terminal 92 of voltage difference amplifier 82. Terminal 94 of amplifier 82 is connected to terminal 96 through a capacitor 98. Voltage of +15 volts is also applied to terminal 95 of amplifier 82. Terminal 80 of amplifier 82 is also connected to the cathode terminal of diode 100 and to the output terminal 102 of amplifier 82 through a resistor 104. Voltage of −15 volts from power supply 84 is applied to terminal 106 of amplifier 82. Output terminal 102 of amplifier 82 is connected to anode terminal of diode 108 and to cathode terminal of diode 100. Cathode terminal of diode 108 is connected to one end of resistor 110 which has its other end connected to anode terminal of diode 100 through resistor 112. Junction point of resistor 110 and 112 is also connected to inverting input terminal 114 of operational amplifier 116. Terminals 118 and 120 of amplifier 116 are connected together through a capacitor 122. Junction point of resistors 86 and 90 is connected to ground and non-inverting input terminal 124 of amplifier 116 through resistor 126. Terminal 128 of amplifier 116 is connected to power supply 84 so as to provide a bias voltage of −15 volts. Terminal 130 of amplifier 116 is connected to power supply 84 so as to provide to +15 volts as a biasing voltage. Output terminal 132 of amplifier 116 is connected to terminal 134 and to the anode terminal of rectifier 100 through resistor 136. Terminal 134 is connected to gate terminal of FET switch 138 and is also connected to the respective gate terminals of FET switches 140 and other similar switches of the circuits for all hydrophones except hydrophone 142 of line array 12. Source terminal of FET switch 138 is connected through a resistor 148 to terminal or tap 144 of delay line 146. Drain terminal of FET switch 138 is connected to the output terminal of preamplifier 150 through resistor 152. The input terminal of the amplifier 150 is connected to one end of hydrophone 154 which has its other terminal connected to ground. Source terminal of each of FET switches 156, 158, and 160 respectively connected to the respective terminals or taps 162, 164, and 166 through the respective resistors 168, 170 and 172. Gate terminal of FET switch 174 is connected to the output of series-parallel combination 66, source terminal thereof is connected to terminal 176 through resistor 178 and the drain terminal thereof is connected to the output terminal of preamplifier 150 to through resistor 180. Drain terminal of each of FET switches 156, 158, and 160 is also connected to the output terminal of amplifier 150 through the respective resistors 182, 184 and 186. In a similar fashion output of series-parallel combination 70 is connected to the gate terminals of FET switch 156 and the gate terminals of the FET switches of the remaining hydrophone circuits. Drain terminal of each of FET switches 188, 140, 190, 192 and 194 is connected to the output terminal of preamplifier 196 through the respective resistors 198, 200, 202, 204 and 206. Source terminal of FET switch 188 is connected to terminal 176 through resistor 208. Input terminal of preamplifier 196 is connected to one terminal of hydrophone 210 which has the other terminal connected to ground. Source terminal of each FET switches 140, 190, 192 and 194 is connected through respective resistors 212, 214, 216 and 218 to taps or terminals 220, 222, 224, and 226 of delay line 146. End taps or terminals 228 and 230 of delay line 146 are connected to ground. Input tap 237 and output tap 238 of delay line 146 are connected to terminals 64 and 62 respectively and also connected to taps 228 and 230 respectively through respective resistors 240 and 242. Terminal 176 is connected to a summer circuit 244 and head set 246 aboard surface ship 14. It should be noted that the present embodiment makes use of five different series-parallel combinations of voltage difference operational amplifiers, steering diodes and voltage rectifiers for the steering control director. Furthermore, in the present embodiment line array 12 comprises 20 hydrophones. However, for illustration purposes, only 3 of these hydrophones and their associated circuitry are shown, the other circuits being identical. It should further be noted that the number of series-parallel combinations of voltage difference operational amplifiers and the number of hydrophones and the associated FET switches for the steering control driver can be varied without deviating from the teachings of this invention. In the present embodiment there are five FET switches which are used in each of the hydrophone circuit and there are five series-parallel combination in the steering control director. Thus the outputs of series-parallel combinations 66, 70, 72 and 74 are connected to the gate terminals of FET switches 232, 174, and 188; 156 and 190; 158 and 192; and 160 and 194 respectively. One end of hydrophone 248 is connected to ground and the other terminal is connected to input terminal of preamplifier 142. The output terminal of preamplifier 142 is connected through resistor 234 to the drain terminal of FET switch 232 and is also connected to input terminal or tap 237 of delay line 146.

The source terminal of FET switch 232 is connected to terminal 176 through resistor 236.

In operation, beam steering the towed array is accomplished through four system components, the beam steering switch 24, the steering control director 34, the gate logic network, and the delay line 146. As an illustration, an operator aboard surface ship 14 rotates the beam steering switch 24 through the relative bearing angles, corresponding DC voltages as shown in FIG. 2 are transmitted down the tow cable to the steering control director 34 in the array electronic package 10. The steering control director comprises 5 DC voltage comparators i.e., difference operational amplifiers, one for each steering angle. Each comparator is followed by a DC inverter, a voltage rectifier operational amplifier, to elimiate the positive saturation state of the difference operational amplifier or comparator so that each has an output of either 0 volt DC (enable) or −12 volt DC (inhibit). As shown in FIG. 2 wiper arms 26 and 28 are connected to the angular position of 105°. Wiper arm 26 then applies a voltage of +4.7 volts from source 30 to the control director 34 via line 36. Thus a voltage of +4.7 volts is applied to the series-parallel combinations 66, 68, 70, and 72, and 74 of voltage difference operational amplifiers, steering diodes and voltage rectifiers of the steering control director. Combination 68 is the only one which sends out an enable signal in the form of 0 volts because of a voltage of +4.7 volts being applied to terminal 92 of operational amplifier 82. Each of the remaining combinations 66, 70, 72, 74, produces an output which is an inhibit signal in the form of −12 volts, because the voltages applied from a source 84 are different from +4.7 volts applied via line 36. The enable signal of 0 volt from terminal 134 of the combination 68 is then applied to the gate terminal of FET switches 138, 140, i.e. the second FET switch in each of the switching banks corresponding to the various hydrophones of the linear array 12. This makes FET switches 138, 140, and so on to conduct through various tap points or terminals of delay line 146 and produce an output at output terminal 238 which is eventually taken to the line driver 56 for current amplification and then to a listening device 58 aboard the surface ship. Thus corresponding to the angular position of 105°, as determined by the operator aboard the surface ship 14, various delay times are introduced in the signals coming from the various hydrophones of the linear array 12 so as to produce a properly delayed output signal from the delay line 146. It should be pointed out that the enabling signal coming from the combination 66 corresponds to 90° angular position and which provides an undelayed, i.e., unsteered beam position through points 176 and line driver 244 to another listening device 246 aboard the surface ship. As shown in FIG. 2, 105° angular position puts no voltage on Fore-Aft relay 44 which puts its contacts in the Aft position as shown therein. Consequently, the terminal 237 acts as the input terminal of the delay line 146 and terminal 238 acts as the output terminal of the delay line 146. It should be pointed out that the resistors 78 and 110 act as the input resistors for operational amplifiers 82 and 116 respectively and capacitors 98 and 122 are used to as compensating capacitors to avoid high frequency oscillations in the circuit. Resistor 104 and 112 are used as feedback resistors and the resistor network comprising resistors 88, 86 and 90 is used to provide biasing voltage for the noninverting input of the operation amplifier 82. Furthermore, the resistors 152, 180, 182, 184 and 186 and so on are used as isolation resistors in the circuits of FET switches 138, 174, 156, 158 and 160 respectively. Resistors 148, 168, 170 172, 212, 214, 216, 218 also act as isolation resistors.

In operation in the position of 105°angular position as shown, combination 68 produces an enable signal of 0 volt as its output whereas the remaining combinations generating inhibit signal of −12 volts each as their outputs whereas the Fore-Aft relay 24 is in its Aft position so that terminals 52 and 62 are connected together by wiper arm 50 of relay 44. An enable signal from terminal 134 provides a low impedance path through FET switches 138, 140 etc., i.e. the second FET switch in each of the FET switch bank for each of the hydrophones of the linear array, for the outputs of hydrophones 154, 210, etc. respectively. The outputs of hydrophones 154, 210 are thus properly delayed through delay line 146 and then are summed at line driver 56 which is used to energize a headphone set 58. In 90°angular position the output of combination 66 provides an enable signal of 0 volt while each of the remaining combinations provide an inhibit signal in the form of −12 volts. This makes FET switch 232 and FET switches 174, 188 etc, the first of the FET switches in each of the FET switch banks for various hydrophones of the linear array, provide the low impedance path. The outputs of hydrophones 142, 154, 210 are sent to terminal 176 where they are summed at summer 244 for energizing headphone set 246. The extent of delays introduced in the paths of the outputs of various hydrophones of the linear array 12 is such that the beam forms a plane so that the output from various hydrophones in the linear array offers itself as a plane wave reaching various hydrophone elements of the linear array. The nine angular positions as shown in FIG. 2 are covered by five different voltages supplied by source 30 due to symmetrical considerations. Furthermore, each angular position has its conjugate beam pattern i.e. for angles 225°, 240°, 270°, 285°, 300°, 315°, corresponding to angular positions of 135°, 120°, 105°, 90°, 75°, 60°, and 54°respectively. It should be pointed out that most of the components used in the circuit 10 are conventional components and can be replaced by equivalents thereof without deviating from the teachings of subject invention. As an example, beam selector switch is two-pole, nine-position switch, preferably Shallcross Model 2H56A8-2; FET (Field Effect Transistor) switches used are preferably Motorola Company Type 2N 4091; operational amplifiers used are preferably Analog Devices Type AD201AH; Fore-Aft relay is preferably Teledyne Model 7044-01; line drivers are preferably Burr-Brown Model 3329; the delay line used in ESC Corp. Model 81–61 and the hydrophone used are Channel Industries Type PZT-4.

Briefly stated, the remote beam steerer according to the teachings of subject invention includes a beam selector switch, a steering control director, an analog switch network, and a delay line. The beam selector switch provides a remote capability of steering the linear array by permitting the selection of any one of a number of listening beam pairs of the array and provides an enable signal to one of the five series-parallel combinations of voltage difference operational amplifiers, steering diodes, and voltage rectifiers of the steering control directors. An enable signal from the steering control director provides a low impedance path for each of the hydrophone elements of the array through one of the FET switches in the switch bank thereof, and high impedance path for the remaining switches in the switch bank for every hydrophone element of array. The output of each of the elements is then properly delayed before the beam is formed by summing the delayed outputs.

Obviously many modifications and variations of the present invention are possible in the light of the above teachings. An an example, a continuously variable potentiometer could be used to transmit various DC control voltages. Furthermore, voltage sensing relays can be used to replace the steering control director circuitry. Furthermore, the number of series-parallel combinations used can be changed without deviating from the teachings of subject invention. It is therefore understood that within the scope of the appended claims the invention may be practiced otherwise then as specifically described.

I claim:

1. A beam steerer for positioning the listening beam of a sonar linear array having a plurality of hydrophones from a remote point aboard a ship, comprising:

a voltage source generating a plurality of D.C. voltage outputs;

beam selector switching means being in communication with said voltage source;

steering control director means being detachably connected to one of said plurality of voltage outputs of said voltage source via said beam selector switching means, said steering control director means generating a plurality of outputs including one output thereof as an enabling output and the remaining outputs thereof as inhibiting outputs;

an analog switching network including a plurality of switch banks, each one of said plurality of switch banks being connected to a respective hydrophone of said plurality of hydrophones of the linear array and being connected to said control director means;

delay means for providing variable delay at a plurality of terminals thereof to the outputs of said plurality of hydrophones of the linear array, said delay means having the input terminal being connected to said analog switching network;

a line driver means having an input terminal and an output terminal, the input terminal thereof being connected to the output terminal of said delay means and the output terminal thereof being connected to a listening means aboard said ship; and a Foreward-Aft relay having a first end being connected to said beam selector switching means and a second end thereof being connected to ground and having the fixed end of a wiper arm thereof being connected to the input terminal of said line driver means and the movable end of the wiper arm being detachably connected to the input and output terminals of said delay means.

2. The beam steerer of claim 1 wherein said beam selector switching means is two pole, nine-position switch having a first wiper arm and a second wiper arm, the movable end of the first wiper of said switch being detachably connected to the plurality of outputs of said voltage source, the movable end of the second wiper arm being detachably connected to one fixed terminal of said voltage source, and the fixed ends of the first and second wiper arms of said switch being connected to said control director means and said Foreward-Aft relay respectively.

3. The beam steerer of claim 2 wherein said control director means includes a plurality of series-parallel combinations each of said plurality of combinations comprising a difference operational amplifier, an invertor, and a pair of steering diodes.

4. The beam steerer of claim 3 wherein each of said plurality of switch banks of said analog switching means includes a plurality of FET switches.

* * * * *